UNITED STATES PATENT OFFICE.

WINFIELD H. GIBSON, OF HOMESTEAD, AND HENRY WESSLING, OF HOPE-CHURCH, PENNSYLVANIA.

PROCESS OF PRODUCING SILICA BRICKS.

SPECIFICATION forming part of Letters Patent No. 701,707, dated June 3, 1902.

Application filed December 17, 1900. Serial No. 40,150. (No specimens.)

*To all whom it may concern:*

Be it known that we, WINFIELD H. GIBSON, residing at Homestead, and HENRY WESSLING, residing at Hopechurch P. O., in the county of Allegheny and State of Pennsylvania, citizens of the United States, have jointly invented or discovered a certain new and useful Improvement in Methods or Processes of Producing Silica Brick, of which improvement the following is a specification.

Our invention relates to silica brick, and particularly to the method or process of producing the same.

Heretofore, so far as we are aware, in the production or manufacture of silica brick—*i. e.*, brick composed principally of silica and adapted to withstand very great degree of heat—it has been impossible to avoid the use of lime to bond or cause the material to adhere or become a compact body, the lime serving as a flux for this purpose. The lime, however small the percentage used, is objectionable, for the reason that the fusing-point thereof is lower than that of the silica comprising the body of the brick. Consequently when the brick was completed and subjected to heat it was liable to disintegrate or fall apart at a temperature much lower than the fusing-point of the silica.

The object of our invention is to remedy this evil and to produce a silica brick or fireproof material which will remain intact and compact at the highest temperature to which this character of brick is subjected; and to this purpose our invention consists in reducing substantially pure silica rock to the condition of fineness to which it is now usual to reduce it prior to compressing the same into form of bricks, then adding to and mixing therewith a quantity of the same material or pure silica reduced to a very fine impalpable powder to bond the coarser material. We have found by successful practice that one hundred and fifty pounds (150 lbs.) of the finely-powdered silica added to and mixed with six thousand pounds (6,000 lbs.) of coarsely-crushed silica rock produces most excellent results. We have found that the finely-powdered silica bonds or cements the coarsely-crushed silica and is sintered or fused between the crystals of the coarser material and produces a brick or material capable of withstanding a degree of heat much greater and still remain intact than silica brick bonded with lime.

For the purpose of repairing the walls or bottom of furnaces during the operation thereof the brick or material produced by our method is almost invaluable, as notwithstanding the extreme high temperature of the furnace our brick or material can be placed in the break in the walls or bottom of the furnace without causing the brick or material to disintegrate or fly apart, as is usually the case with silica brick bonded with lime.

We have stated that our brick is composed of silica in the proportions of one hundred and fifty pounds (150 lbs.) of finely-powdered silica added to and mixed with six thousand pounds (6,000 lbs.) of coarsely-crushed silica. This, however, may be varied and very good results secured. Therefore we do not limit ourselves to these proportions.

After preparing the materials as herein specified the usual method of drying, burning, and cooling the brick is carried out.

We do not herein claim the brick as an article of manufacture, the same being the subject-matter of our copending application, Serial No. 62,432, filed May 29, 1901.

What we claim as our invention, and desire to secure by Letters Patent, is—

1. The herein-described method or process of producing refractory brick or fireproof material consisting in mixing substantially pure coarsely crushed or ground silica with substantially pure silica reduced to a fine or impalpable powder, then drying and burning the same.

2. The herein-described method or process of producing refractory brick or fireproof material consisting in mixing substantially pure coarsely crushed or ground silica with substantially pure silica reduced to a fine or impalpable powder in the proportions of forty (40) parts of the coarse material mixed and commingled with one (1) part of the powdered material, then drying and burning the same.

WINFIELD H. GIBSON.
HENRY WESSLING.

In presence of—
CLARENCE A. WILLIAMS,
JOHN H. RONEY.